US009433201B2

(12) United States Patent
Azzarello, Jr. et al.

(10) Patent No.: US 9,433,201 B2
(45) Date of Patent: Sep. 6, 2016

(54) PEST CONTROL SYSTEM AND METHOD

(71) Applicants: Joseph F. Azzarello, Jr., Metairie, LA (US); Marcus Azzarello, New Orleans, LA (US)

(72) Inventors: Joseph F. Azzarello, Jr., Metairie, LA (US); Marcus Azzarello, New Orleans, LA (US)

( * ) Notice: Subject to any disclaimer, the term of this patent is extended or adjusted under 35 U.S.C. 154(b) by 329 days.

(21) Appl. No.: 14/274,654

(22) Filed: May 9, 2014

(65) Prior Publication Data
US 2014/0331544 A1 Nov. 13, 2014

Related U.S. Application Data

(63) Continuation-in-part of application No. 13/199,344, filed on Aug. 26, 2011, now abandoned.

(51) Int. Cl.
*A01M 1/20* (2006.01)
*A01M 1/02* (2006.01)

(52) U.S. Cl.
CPC ............ *A01M 1/026* (2013.01); *A01M 1/2011* (2013.01); *A01M 2200/011* (2013.01)

(58) Field of Classification Search
USPC .................... 43/131, 132.1, 121, 133, 107
See application file for complete search history.

(56) References Cited

U.S. PATENT DOCUMENTS

| | | | | |
|---|---|---|---|---|
| 6,016,625 A * | 1/2000 | Bishoff | .................. | A01M 1/026 43/107 |
| 6,158,166 A * | 12/2000 | Snell | ...................... | A01M 1/026 43/121 |
| 6,401,384 B1 * | 6/2002 | Contadini | .............. | A01M 1/026 43/107 |
| 6,474,015 B1 * | 11/2002 | Lund | ...................... | A01M 1/026 43/124 |
| 6,860,062 B2 * | 3/2005 | Spragins | ............... | A01M 1/026 43/107 |
| 7,212,129 B2 * | 5/2007 | Barber | .................. | A01M 1/026 29/825 |
| 7,937,886 B2 * | 5/2011 | Bernard | ............... | A01M 1/2011 43/121 |
| 2005/0284017 A1 * | 12/2005 | Kongshaug | ......... | A01M 1/2005 43/131 |
| 2008/0104882 A1 * | 5/2008 | Bernard | ............... | A01M 1/2011 43/131 |
| 2009/0090045 A1 * | 4/2009 | Baker | ................... | A01M 1/026 43/132.1 |
| 2009/0300968 A1 * | 12/2009 | Zajac | ................... | A01M 1/2011 43/132.1 |
| 2010/0043276 A1 * | 2/2010 | Eger, Jr. | ................ | A01M 1/026 43/131 |
| 2014/0007489 A1 * | 1/2014 | Bonacic Kresic | .... | A01M 1/103 43/121 |
| 2014/0109463 A1 * | 4/2014 | Zajac | ................... | A01M 1/2011 43/131 |
| 2014/0259880 A1 * | 9/2014 | Gigliotti | ............. | A01M 25/002 43/131 |
| 2015/0027033 A1 * | 1/2015 | Matsuura | .............. | A01M 1/026 43/131 |

\* cited by examiner

*Primary Examiner* — Christopher P Ellis
(74) *Attorney, Agent, or Firm* — Keaty Law Firm LLC

(57) ABSTRACT

A system and method of monitoring and controlling cellulose-consuming pests in a predetermined location provides for the use of an assembly that has a main body with a cylindrical upper portion and a lower portion continuously co-axially formed with the upper portion. The lower portion is formed as blades meeting at a lowermost point and defining a sharp bottom point that helps penetrate the soil in the selected location. A plurality of cellulose-containing bait units are detachably fitted in the lower portion and the upper portion. The bait units fitted in the lower portion are retained by the blade portions, which engage radial slots of the bait units. A moisture-retaining member is positioned in the upper portion above an uppermost of the bait units. A removable cap frictionally fittingly engages with the upper portion. The cap has an opening allowing water to be poured into the main body to moisten the bait units and make them more attractive to foraging insects. If consumption of the cellulose material is detected, the bait units substituted with a bait material containing poisonous substance. The pests consume the bait and carry the poison to the colonies.

60 Claims, 15 Drawing Sheets

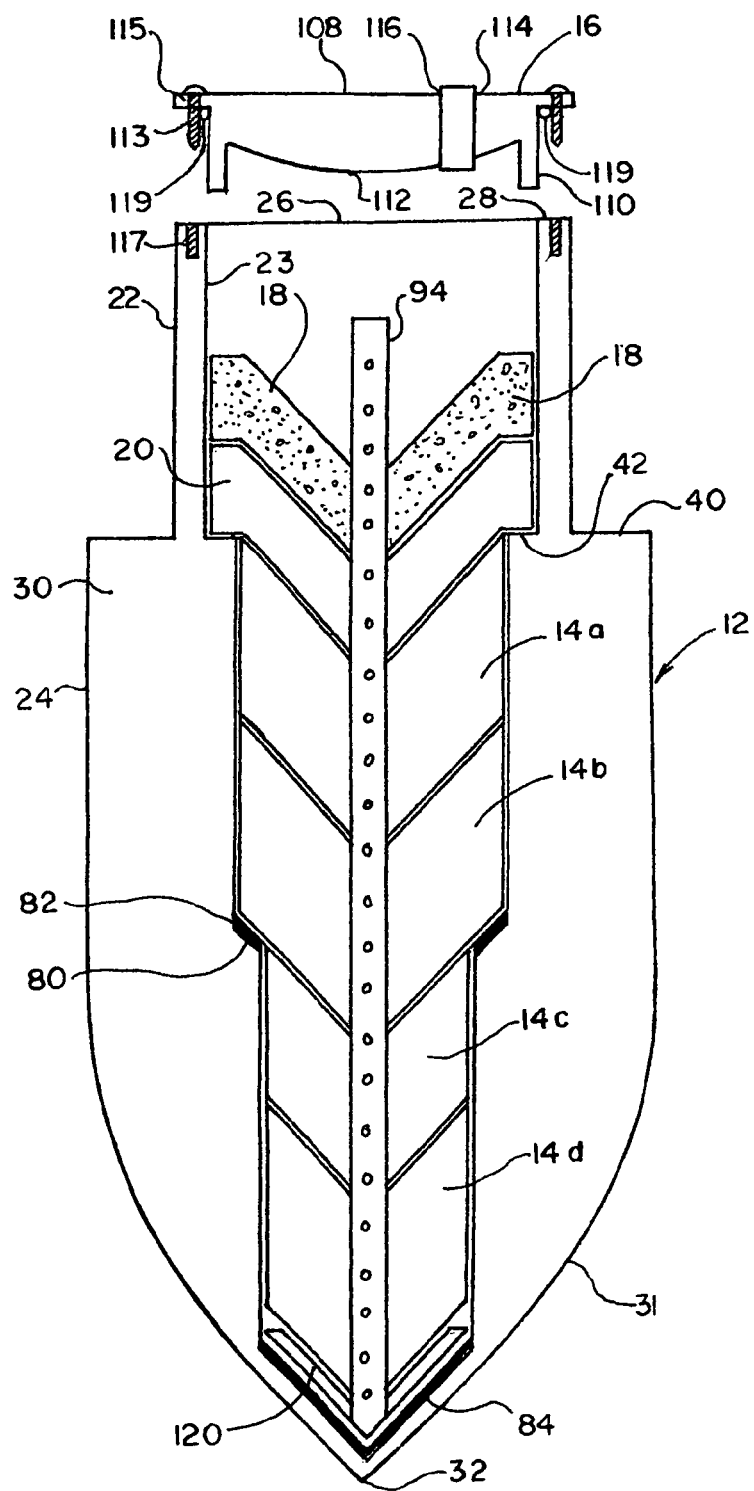
F I G. 2

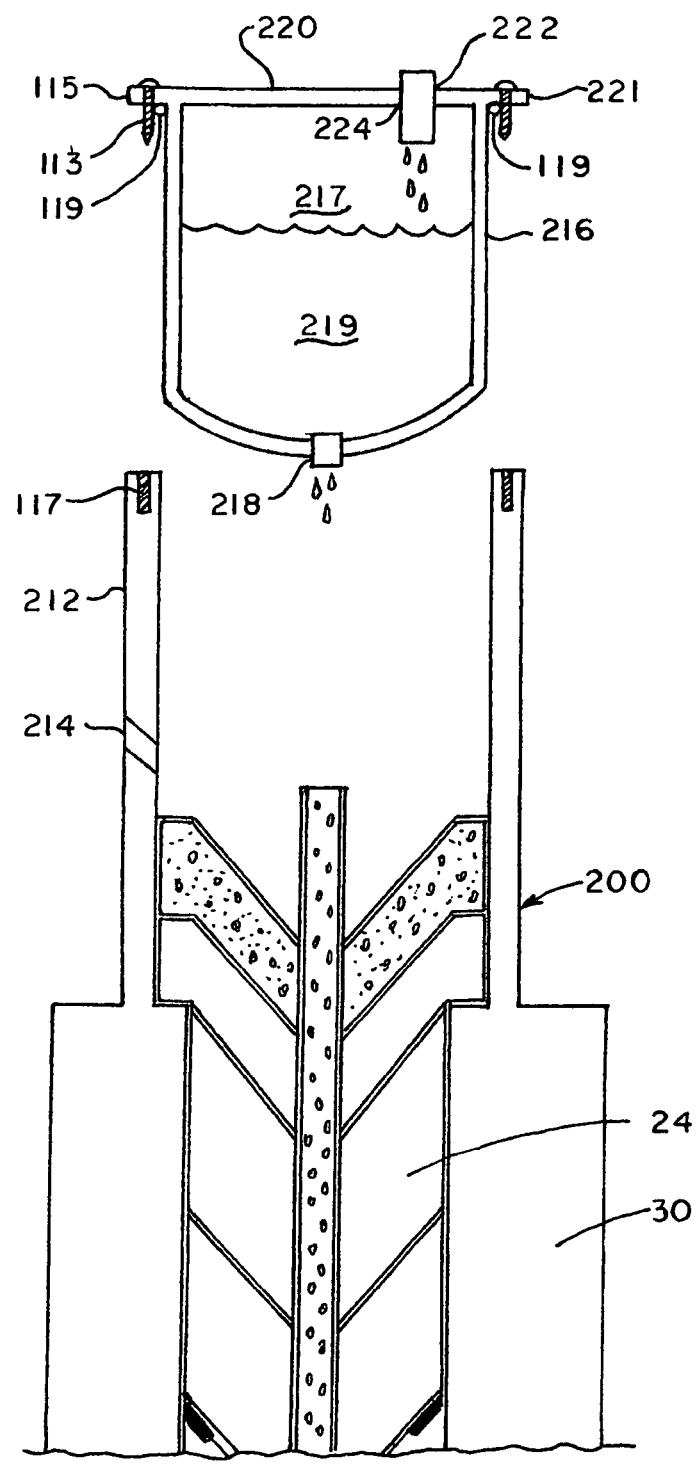
F I G. 5

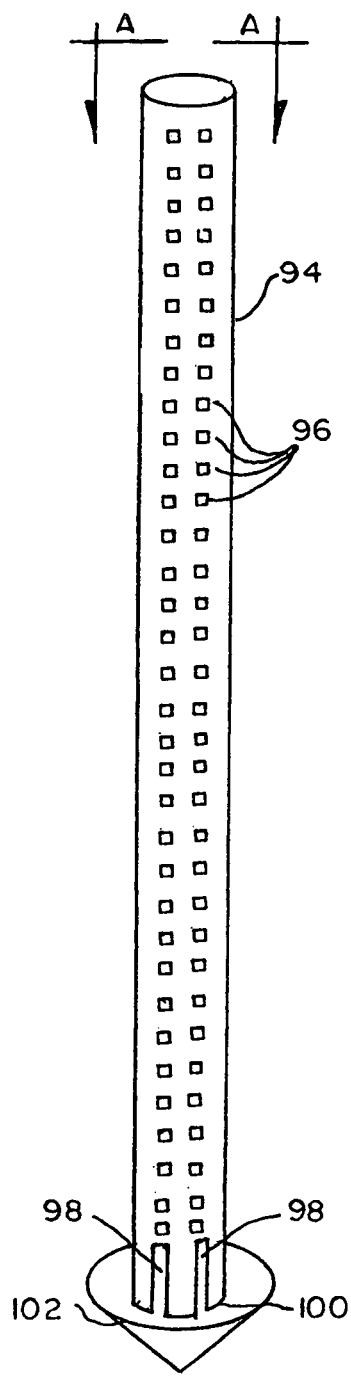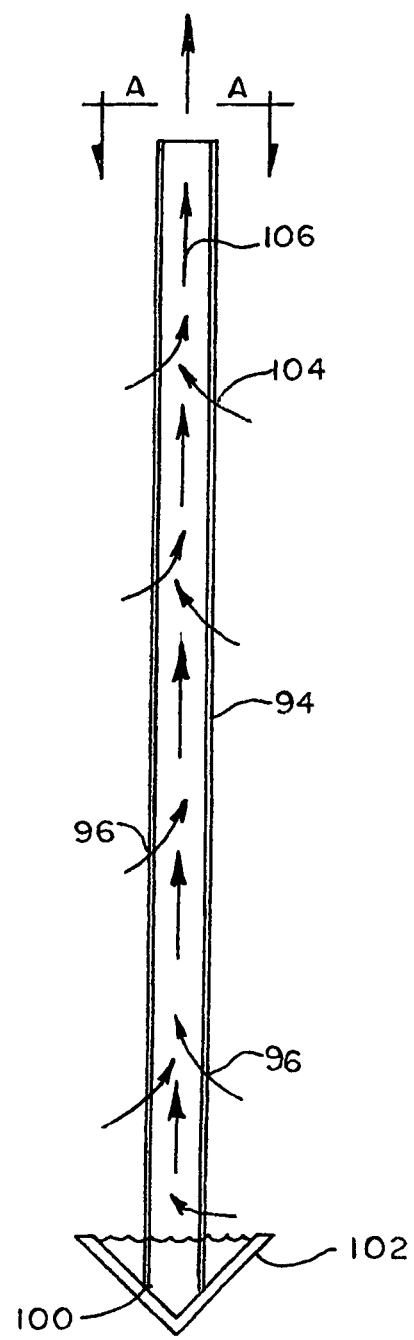
F I G. 6          F I G. 7

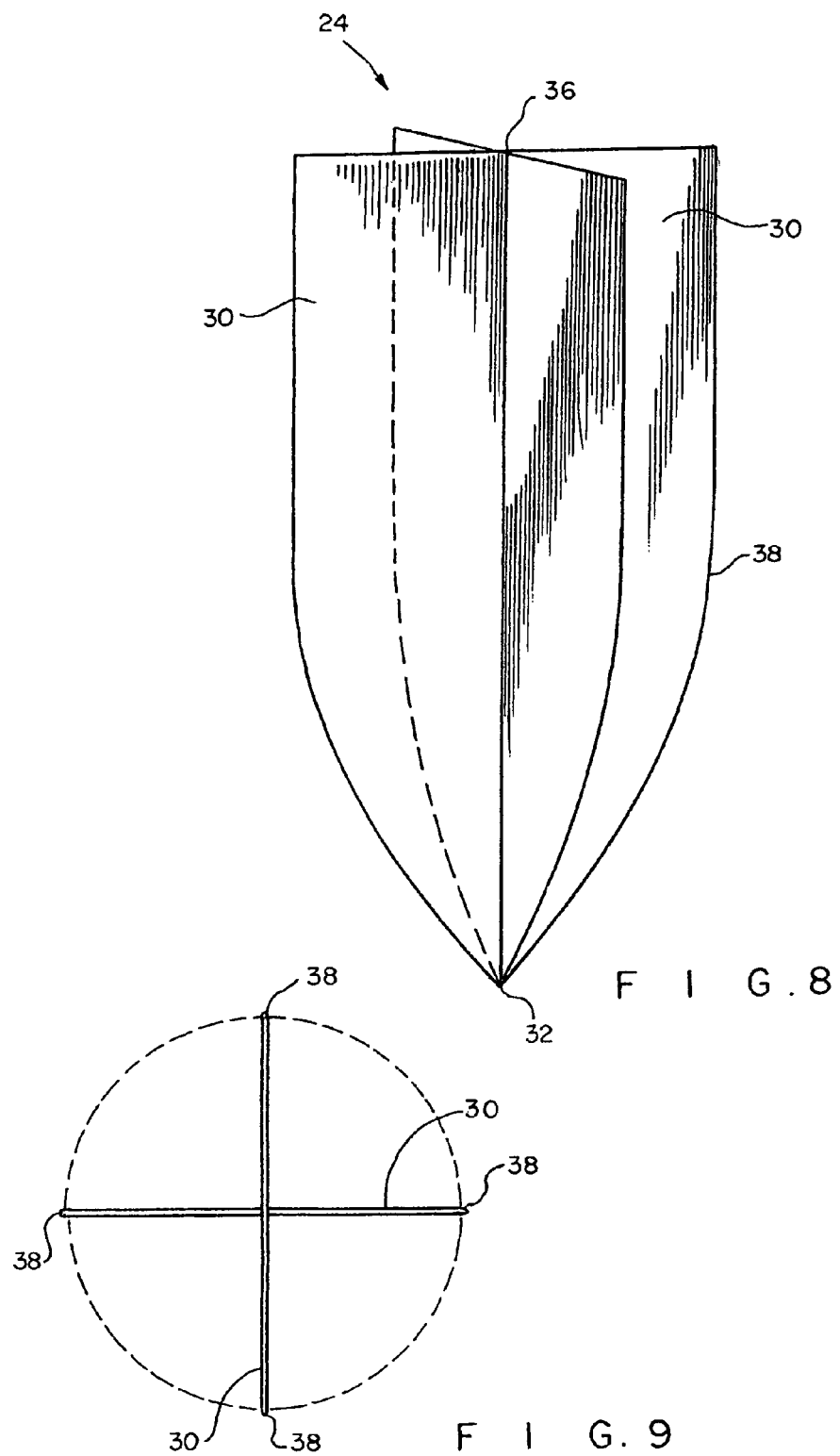

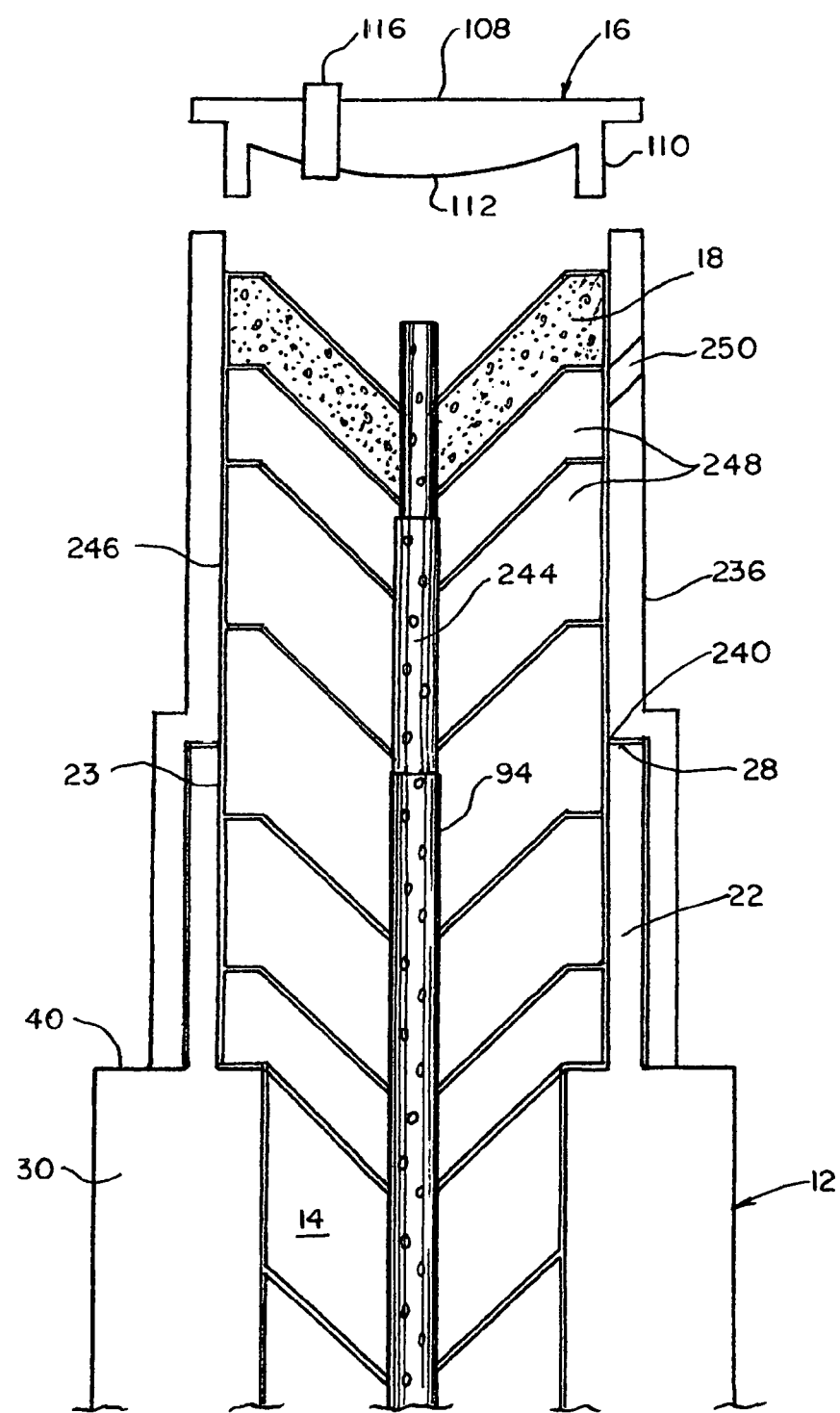
F I G . 10

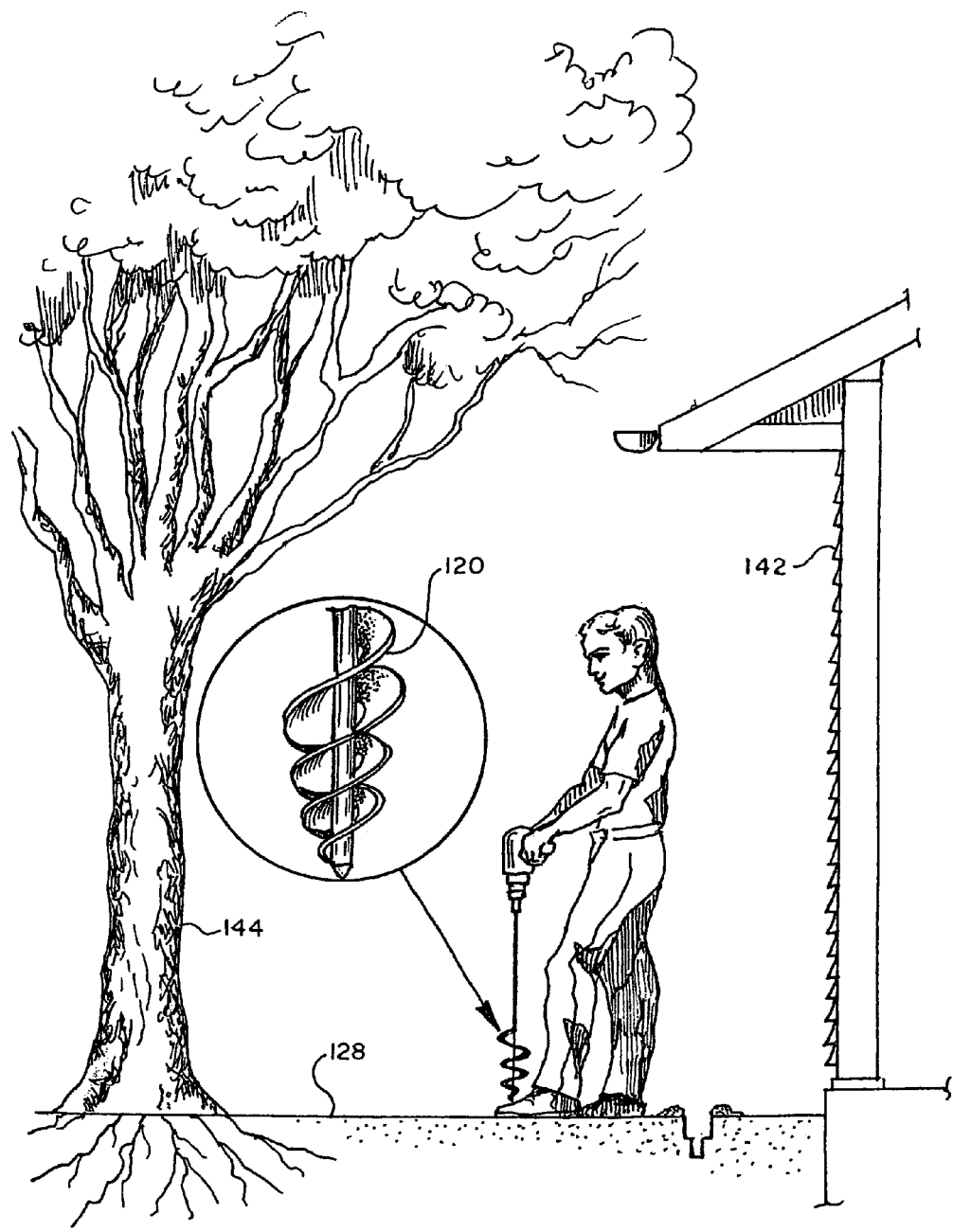
F I G. 13

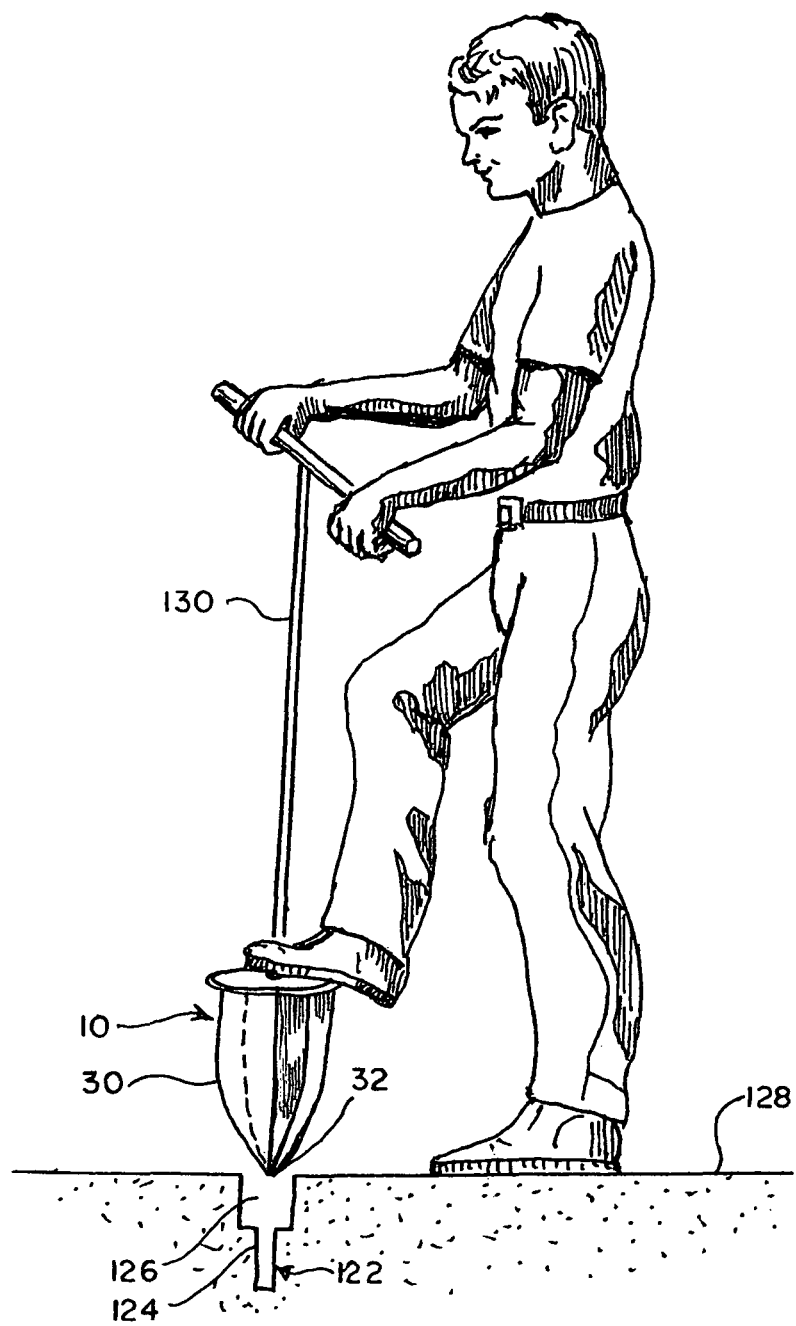
F I G. 14

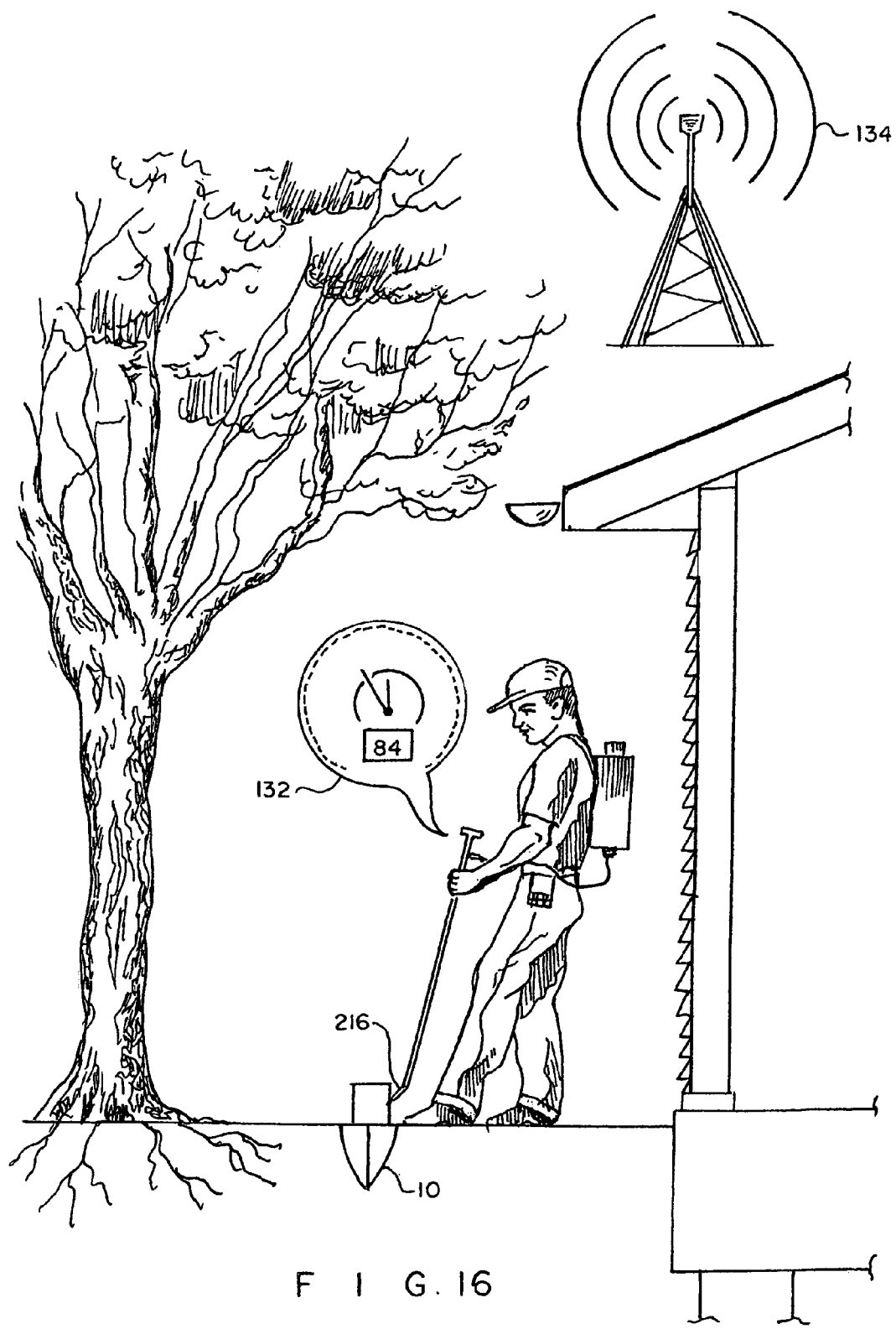
F I G. 16

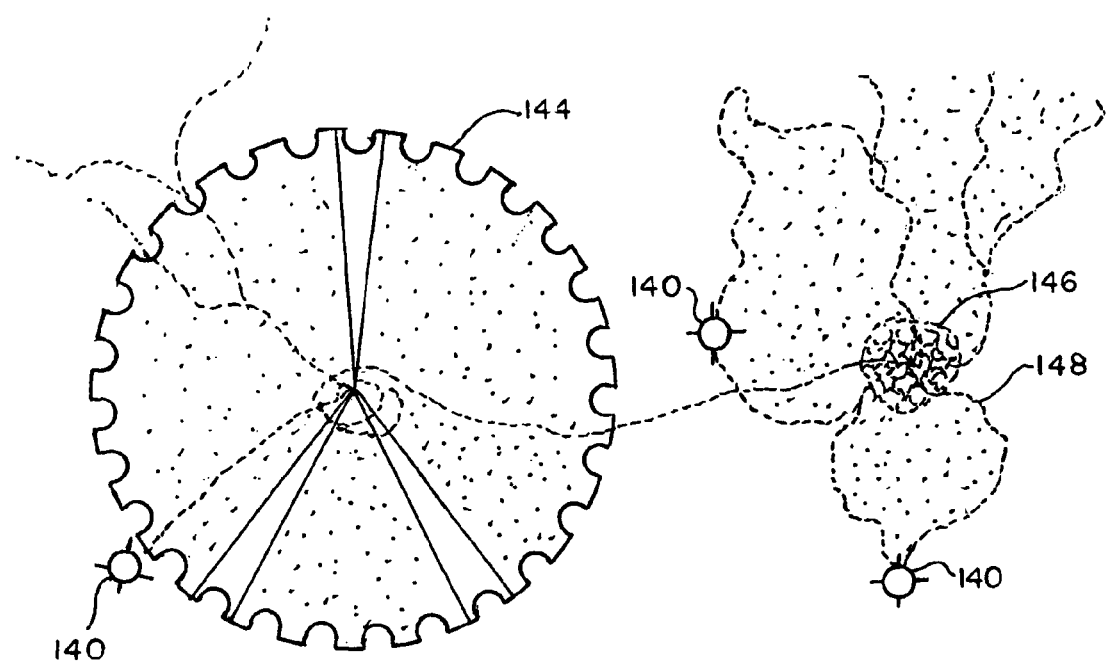
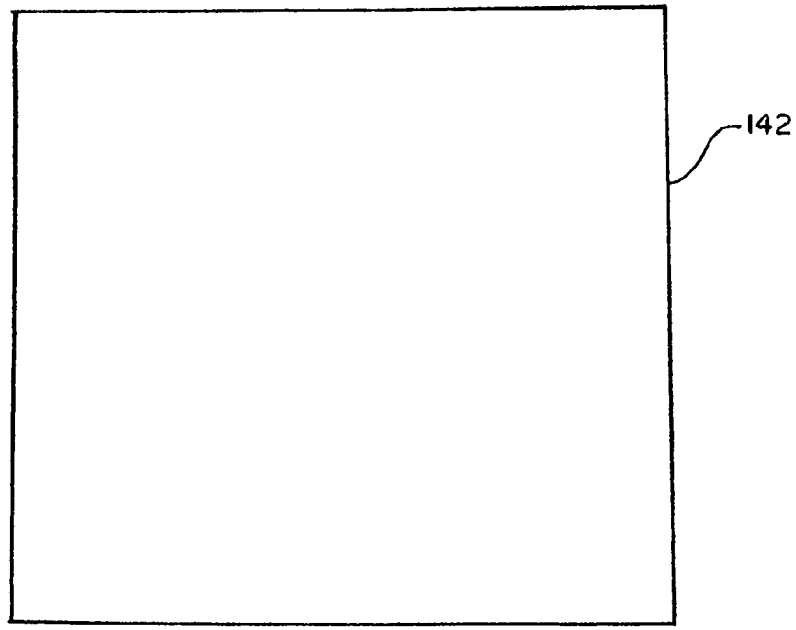
F I G. 17

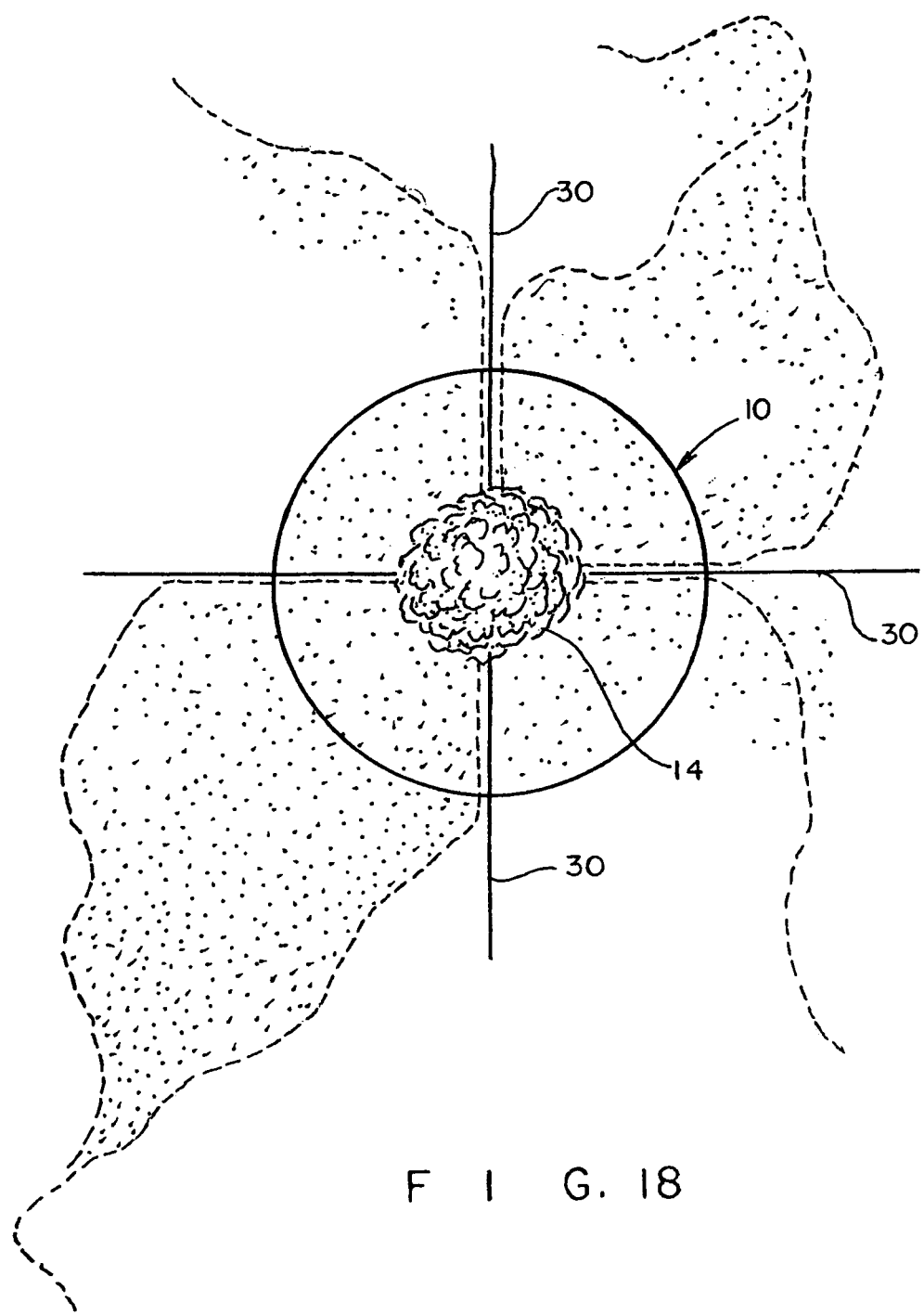
F I G. 18

PEST CONTROL SYSTEM AND METHOD

CROSS-REFERENCE TO RELATED APPLICATIONS

This application is a continuation-in-part of my co-pending application Ser. No. 13/199,344 filed on Aug. 26, 2011, the full disclosure of which is incorporated by reference herein and priority of which is hereby claimed.

BACKGROUND OF THE INVENTION

This invention generally relates to a pest control system, and more particularly to a system that allows attraction and elimination of colonies of cellulose-eating pests, such as termites, and other food foraging arthropods.

Many pests, such as termites, are serious threats throughout much of the world to structures or other objects containing wood or other cellulose containing components because these pests consume cellulose for nutrition. Subterranean termites, which typically dwell in the soil, often form large colonies. Members of the colony forage for food and thus burrow out passageways in the soil outwardly from the nest. Portions of the food located by the foraging termites are returned to the nest. Termites are also known to possess means for communicating the location of a food source to other termites within the colony.

*Coptotermes formosanus* is an invasive species of termite; it is often nicknamed the super-termite because of its destructive habits. This is because of the large size of its colonies, and the termites' ability to consume wood at a rapid rate. A single colony may contain several million individuals (compared with several hundred thousand termites for other subterranean termite species) that forage up to 300 feet (100 m) in soil. A mature Formosan colony can consume as much as 13 ounces (400 g) of wood a day and severely damage a structure in as little as three months. Because of its population size and foraging range, the presence of a colony poses serious threats to nearby structures. Formosan subterranean termites infest a wide variety of structures (including boats and high-rise structures) and can damage trees. In the United States, along with another species, *Coptotermes gestroi*, also introduced from Southeast Asia, are responsible for tremendous damage to property resulting in large treatment and repair costs.

Another highly destructive type of termites is *Reticulitermes flavipes*, the eastern subterranean termite, which is the most common termite found in North America. These termites feed on cellulose material such as the structural wood in buildings, wooden fixtures, paper, books and cotton. A mature Formosan termite colony can range from 20,000 workers to as high as 5 million workers and the queen of the colony lays 5,000 to 10,000 eggs per year. Both *Coptotermes formosanus* and *Reticulitermes flavipes* also feed on cellulose material above ground. In many instances, *Coptotermes formosanus* will build above-ground colonies in the wood they are consuming. These colonies may be associated with above-ground moisture such as rain, outdoor plant material or moisture leaks in man-made structures. In such cases, the Formosan termites demonstrate a definite preference to feeding and colonizing at grade and above ground.

Many pest control systems are known and formed in a wide variety of configurations to monitor and eradicate the pests. One type of popular termite control system, for example, utilizes a monitoring bait food source that is placed below grade; the food source attracts the termites, which begin feeding from the device. The bait has a toxic material, which once consumed, helps in the elimination or suppression of the entire termite colony. However, such systems may be ineffective against the termites that cannot locate the bait.

It has been observed that termites and other pests tend to find a vertical surface, along which they crawl from an underground location in search of food and water. Conventional colony-eradication devices are mostly of cylindrical configuration with smooth exterior walls that may prevent some of the pests from reaching the bait.

The present invention contemplates elimination of drawbacks associated with conventional pest control systems and provision of a pest control system designed to eradicate below-ground and above-ground colonies of cellulose-eating insects.

SUMMARY OF THE INVENTION

It is, therefore, an object of the present invention to provide a pest-control system and method that is designed to eradicate foraging pests, by increasing the likelihood of the foraging termites to find the bait. This is due to the unique design that channels foraging insects to the center of the device, thus consuming the bait.

It is another object of the invention to provide a pest control system and method of monitoring presence of pests, such as termites in pre-selected locations.

It is a further object of the invention to provide a system and method that allows retention of moisture on the bait material for a considerable period of time, in the event of a period of less rain fall.

These and other objects of the invention are achieved through a provision of a system and method of monitoring and controlling cellulose-consuming pests in a predetermined location provides for the use of an assembly that has a main body with a cylindrical upper portion and a lower portion continuously co-axially formed with the upper portion. The lower portion is formed as blades meeting at a lowermost point and defining a sharp bottom point that helps penetrate the soil in the selected location. A plurality of cellulose-containing bait units are detachably fitted in the lower portion and the upper portion. The bait units fitted in the lower portion are retained by the blade portions, which engage radial slots of the bait units. A moisture-retaining member is positioned in the upper portion above an uppermost of the bait units. A removable cap frictionally fittingly engages with the upper portion. The cap has an opening with gasket allowing water to be poured into the main body to moisten the bait units and make them more attractive to foraging insects. If consumption of the cellulose material is detected, the bait units are substituted with a bait material containing poisonous substance. The pests consume the bait and carry the poison to the colonies. This design incorporates below grade, at grade, and above grade cellulose source, thus giving the insect a choice of feeding locations. This increases the chance of the insect actually finding and consuming the bait food source.

BRIEF DESCRIPTION OF THE DRAWINGS

Reference will now be made to the drawings. Wherein like parts are designated by like numerals, and wherein

FIG. 2 is a sectional, partially exploded view of the pest control assembly of the first embodiment.

FIG. 5 is a sectional view of the second embodiment of the pest control assembly according to the present invention.

FIG. 6 is a detail perspective view of a perforated riser and a moisture collector secured on the bottom of the riser.

FIG. 7 is a side view of the riser illustrating evaporation and condensation effect employed in the pest control system of the present invention.

FIG. 8 is a plan view of the use main body of the pest control assembly according to the present invention.

FIG. 9 is a top view of the use main body.

FIG. 10 is a detail sectional view of the third embodiment of the pest control assembly according to this invention.

FIG. 13 illustrates a user preparing a hole in the ground for receiving the pest control assembly of the present invention.

FIG. 14 illustrates a user positioning the pest control assembly in the prepared hole.

FIG. 16 illustrates inspection of the bait station formed by the pest control system of the present invention and data collection.

FIG. 17 illustrates location of the bait stations of the present invention relative to a building structure.

FIG. 18 illustrates pathways formed by directional wings which direct pests attracted to the pest control system of the present invention.

DETAIL DESCRIPTION OF THE INVENTION

Figure 1:
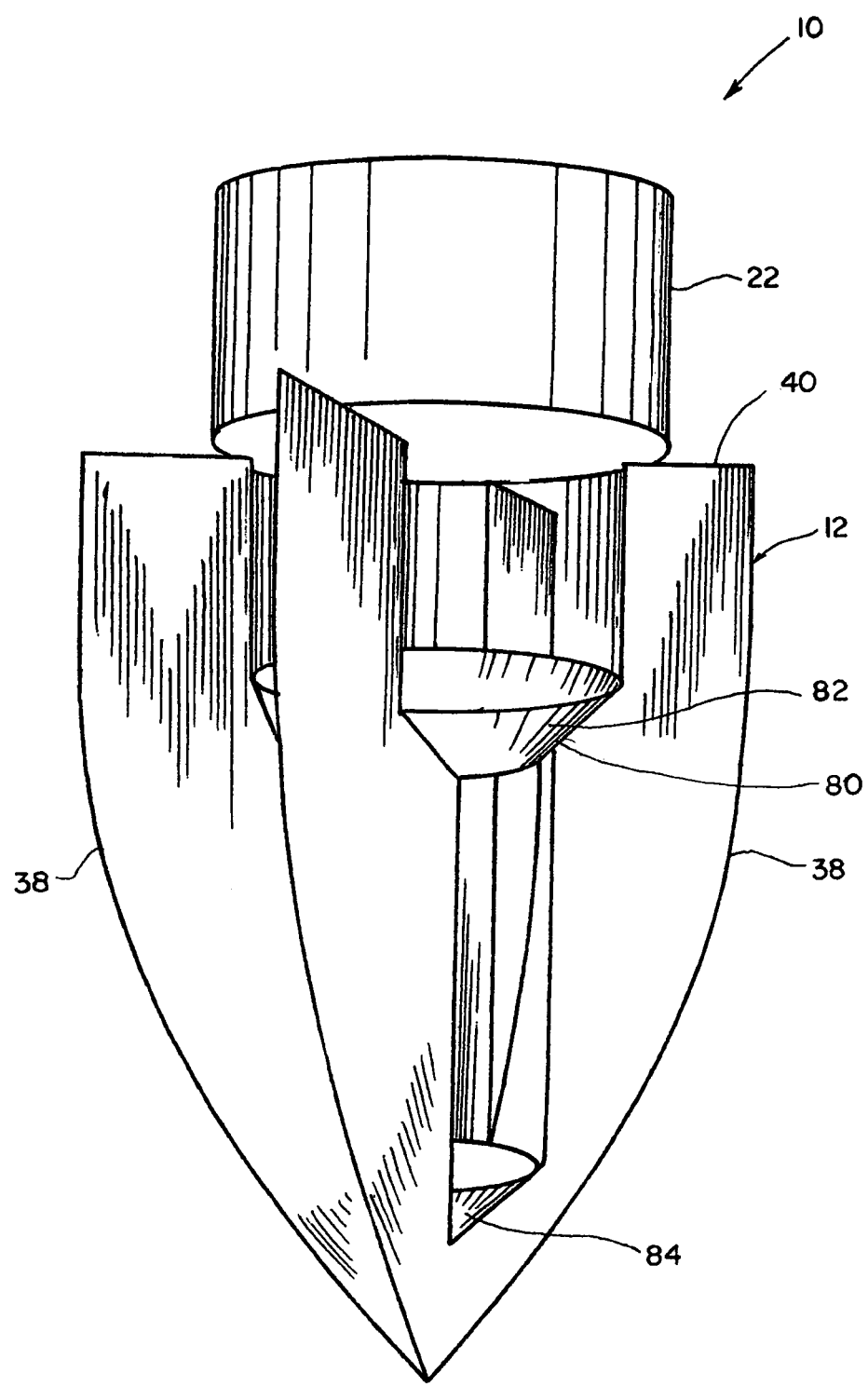
FIG. 1 is a perspective view of the pest control assembly according to the first embodiment of the present invention.
Figures 3, 4:
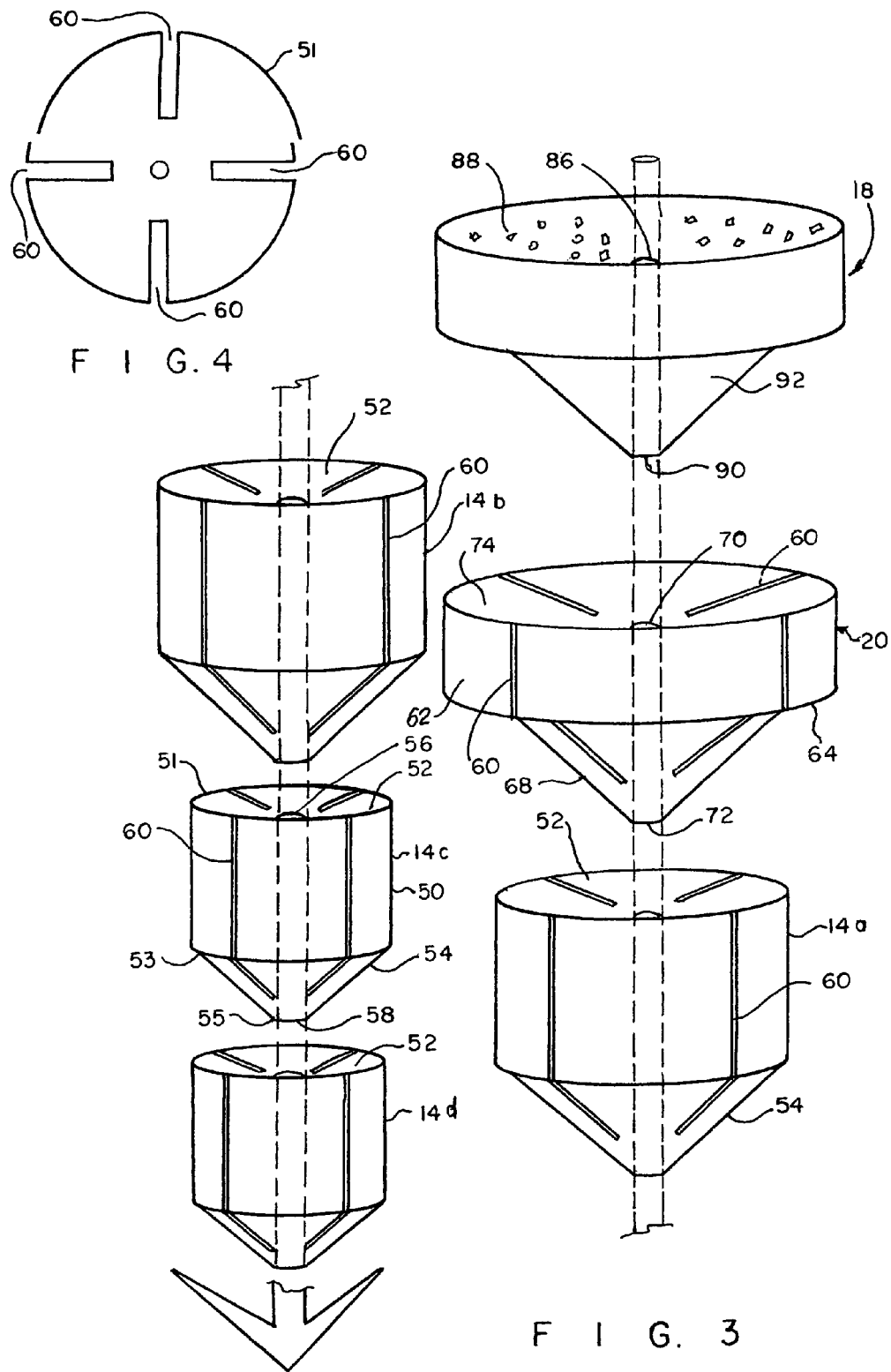
FIG. 3 is an exploded view of the bait units and a moisture retaining unit.
FIG. 4 is a top view of the bait units.

Turning now to the drawings in more detail, numeral 10 designates the pest control assembly according to the first embodiment of the present invention. The assembly 10 comprises a main body 12, a plurality of axially aligned bait units 14 detachably engageable with the main body 12, a removable cap 16 fitted over the top of the main body 12, and a moisture retaining member 18 detachably mounted in the main body 12 between the uppermost bait unit 20 and the cap 16.

The main body 12 comprises an upper hollow cylindrical portion 22 and a lower co-axially extending, portion 24. The upper portion 22 has a top open end defined by an upper edge 28. A plurality of fin-shaped blades 30 defines the lower portion 24. Each of the blades 30 can be configured as an inverted triangle, with a sharp point 32 facing downwardly. Each blade 30 comprises a smooth planar narrow body of generally triangular configuration although the bottom part 31 can be formed arcuate, as illustrated in the drawings.

Each blade 30 has an inner edge 36 and an outer edge 38. The blades 30 can intersect and be joined at their inner edges 36, as shown in an exemplary embodiment of FIGS. 8 and 9. The blades can be three of more in number equidistantly spaced about the circumference of the main body 12.

The upper portion 22 and the lower portion 24 can be unitary formed from a single sheet of rigid sturdy material, such as metal or plastics. The upper portion 24 can be rigidly affixed to an upper edge 40 of each blade 30. Alternatively, the upper portion 22 can be detachably engageable with the lower portion 24. An inwardly extending horizontal shoulder 42 is formed between an inner surface 23 of the upper portion 22 and an inner part of the blades 30. The shoulder 42 supports at least one of the bait units 14, as will be explained in more detail hereinafter.

The main body 12 is configured to carry a plurality of bait units 14, which can be of the same size or of different sizes. In one of the preferred embodiments, the bait units 14 have a hollow substantially cylindrical central body portion 50, an upper plate 52 extending over the top of the central body portion 50, and a lower part 54 secured to the bottom of the central body portion 50. The upper plate 52 has an inverted cone configuration having a central opening 56 communicating with the hollow interior of the central body portion 50. The upper plate 52 has its widest part secured to the top edge 51 of the central body portion 50, while the apex of the plate 52 extends downwardly into the central body portion 50.

The lower part 54 has an inverted cone configuration with its widest part secured to the bottom edge 53 of the central body portion 50. An apex 55 of the lower part 54 is provided with a central opening 58, which is co-axially aligned with the opening 56 in the upper plate 52.

A plurality of radial slots 60 extend from the upper plate 52, along the cylindrical wall of the central body portion 50 and continue to the lower part 54. The slots 60 are configured to receive the blades 30 of the main body 12 when the bait units 20, 14a-14d are fitted within the main body 12. The bait units 20, 14a-14d are formed from cellulose-containing substance, which is particularly attractive to subterranean and above-ground foraging pests. The bait units can be formed as unitary bodies from pressed cellulose-containing substance.

The uppermost bait unit 20 has an enlarged central body portion 62, which forms a horizontal inwardly extending shoulder 64, which connects with the lower conical part 68. The shoulder 64 is configured to rest on the horizontal shoulder 42 of the blades 30. Similarly to the bait units 14a-14d, the uppermost bait unit 20 is provided with aligned openings 70, 72 formed in an upper conical plate 74 and the lower conical part 68, respectively.

As can be seen in FIG. 2, the bait units 14a and 14b are slightly larger in diameter than the bait units 14c and 14d. An inclined shoulder 80 is formed between the bottom sharp point 32 of the blades 30 and the horizontal shoulder 42. A first soil displacement member 82 is fitted on the main body 12 to fit between the blades 30 and rest on the inclined shoulder 80. A second soil displacement member 84 is fitted on the main body 12 below the bait unit 14d.

Each of the first soil displacement member 82 and the second soil displacement member 84 is formed as a hollow member of inverted-cone configuration, with its apex facing downwardly. The first and the second soil displacement members 82, 84 are formed from a relatively rigid material, which protects the lower portions of the bait units from being crushed as the assembly 10 is driven into the ground.

The moisture-retaining member 18 can be formed to match the configuration of the uppermost bait unit 20 and fit within the upper portion 22 of the main body 12. The moisture-retaining member 18 is positioned above the uppermost bait unit 20. The moisture-retaining member 18 can be formed from an open-cell foam material, such as sponge. The moisture-retaining member 18 is formed with an opening 86 in its upper cone 88 and an aligned opening 90 in the lower cone 92.

The bait units 14 are stacked vertically on the blades 30, above the second cone 84. The lower bait units can be one or more in number. Additional bait units are stacked vertically above the first soil displacement member 82, and can be also one or more in number. The bait units are vertically aligned with the earth-displacing first and second soil displacement members 82, 84 such that the openings in the bait units define a central passageway for a riser tube 94. The lower part of each subsequent bait unit fits an upper plate of the bait unit below with the conical parts having a matching angle to allow stacking. The upper plate 52 of the lowermost bait unit is configured to receive a matching angle lower conical part 54 of the bait unit positioned above it. The stacking of the bait units is completed with the uppermost bait unit 20, which frictionally receives the moisture-retaining member 18 within its upper cone plate 88.

The riser tube 94 is inserted through the aligned openings 86, 90, 70, 72, 56 and 58. The riser tube 84 extends from the second cone 84 to a distance above the moisture-retaining member 18. In one aspect of the invention, the riser tube 94 extends within the upper portion 22 of the main body 12.

Turning now to FIGS. 6 and 7, the riser tube 94 is illustrated in more detail. The riser tube 94 extends along a longitudinal axis of the main body 12. The riser tube comprises an elongated tubular body having a plurality of perforations 96 formed along the sidewall thereof. A bottom of the riser tube 94 is provided with longitudinal slots 98 extending from the bottom edge 100 of the riser tube 94 a distance upwardly. The bottom edge 100 of the riser tube 94 rests on a conical moisture collector 102, which frictionally fits in the second cone 84. In one aspect of the invention the exterior surface of the conical reservoir matches the interior surface of the second cone 84 allowing a stable positioning of the moisture collector 102 within the second cone 84.

The riser tube 94 allows circulation of moisture to the bait unit so that they are kept moist to attract the termites. The moisture penetrates through the openings 96 and rises through the riser tube interior as schematically shown by arrows 104 and 106 in FIG. 7. Some of the moisture is collected in the inverted cone of the moisture collector 102. It is envisioned that the moisture collector 102 can also receive some of the cellulose material of the bait units should the material become loose.

The cap 16 removably fits over the upper portion 22 of the main body 12. The cap 16 comprises a flat planar top 108, a cylindrical sidewall 110, and an outwardly convex bottom surface 112. The diameter of the planar top 108 is at least slightly greater than the diameter of the sidewall 110, and a circumferential flange 109 is formed between an edge 111 of the planar top 108 and the exterior of the sidewall 110. The circumferential flange 109 allows the user to lift and remove the cap 16 for inspecting conditions of the bait units in the assembly 10. The cap 16 may also allow for a means of securing or sealing the cap 16 to the main body 12. One preferred embodiment allows for securing the cap 16 to the main body 12 by providing fastener ports 115,117. The upper fastener port 115 is located on a circumferential flange 109 distally from the sidewall 110 and extends through the portion of top surface 108 that forms the circumferential flange 109 to the bottom of the circumferential flange 109 which contacts the upper edge 28 of the main body 12. The lower fastener port 117 aligns with the upper fastener port 115 and is a hole that extends a length slightly longer than the fastener 113. The fastener should have a length slightly shorter than the combined lengths of the upper and lower fastener ports 115,117. Once the cap 16 is placed over the main body 12, the fastener 113 is placed through the upper fastener port 115 and continues into the lower fastener port 117 to secure the cap 16 to the main body 12. To ensure a sealing engagement of the cap 16 with the main body 12, an 0-ring 119 is fitted to the underside of the circumferential flange 109. The O-ring 119 presses against the exterior of the sidewall 110.

The outside diameter of the sidewall 110 is at least slightly smaller than an inner diameter of the upper portion 22 of the main body 12 such that the sidewall 110 of the cap 16 frictionally tightly fits inside the upper portion 22. A port 114 is formed in the cap 16 extending from the top surface 108 to the bottom surface 112 of the cap. A short tube 116 may be inserted in the port 114. The port 114 serves as an inlet for water to be added to the bait units and allows optional collection of data about the physical conditions inside the assembly 10, such as dew point, humidity and temperature.

Figure 19:
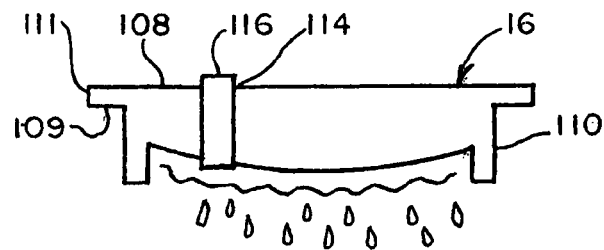
FIG. 19 illustrates condensation of water on the cap of the assembly of this invention.

As can be seen in FIG. 19, the outwardly convex bottom surface 112 of the cap 16 helps to direct water rising through the riser tube 94 toward the center of the main body 12, where the riser tube 94 extends. The moisture is re-circulated back into the bait units 14 to keep them from becoming dry.

To place the assembly 10 in the soil, the user creates a hole using any available equipment, for instance an auger shown in FIG. 13. The auger 120 is a two-stage auger having smaller helical blades on the bottom and larger helical blades above. The soil auger 120 is capable of forming a two-stage hole 122 in the soil, with a smaller diameter hole 124 in the bottom and a larger diameter hole 126 above. The hole 122 is configured to receive the assembly 10, allowing the sharp ends 32 of the blades 30 to lead the assembly into the hole.

Figure 15:
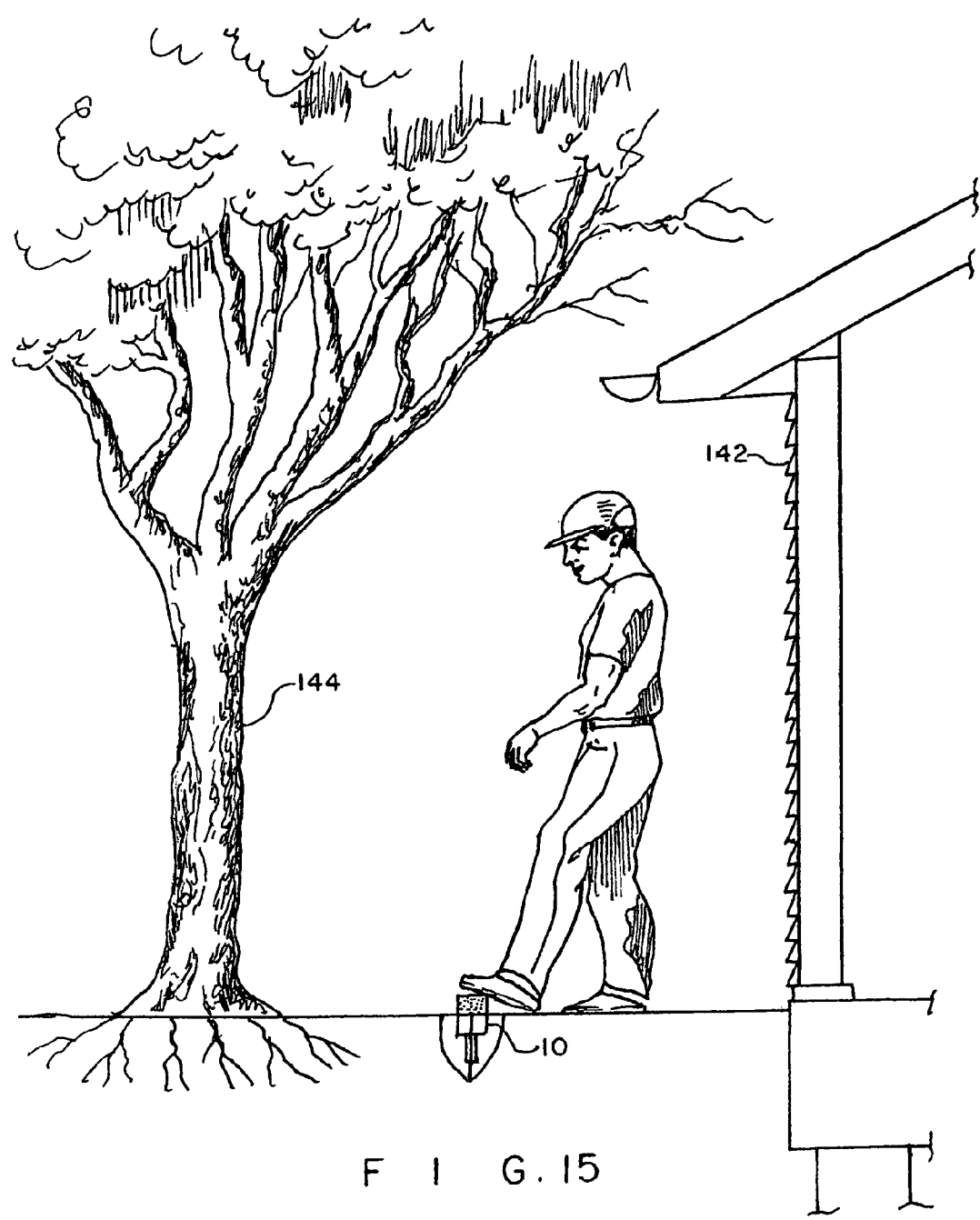
FIG. 15 illustrates the user positioning the pest control assembly in the soil and applying downward force for embedding the pest control assembly in the formed hole.

In operation, the main body 12 with the first and second soil displacement members 82, 84, is placed directly in the prepared hole 122 in a location where the presence of pests is detected or suspected. It is preferred that the soil has moisture content greater than 5% in the selected location. The user ensures that the blades 30 are embedded into the soil 128 such that the lower portion 24 of the body 12 is below ground, while the upper portion 22 may extend above ground. If necessary, the user applies a downward force with a hand tool 130, as shown in FIG. 14. Alternatively, the user can force the main body 12 into the hole 122 using his hands or foot, as shown in FIG. 15.

The blades 30 secure the assembly 10 in the ground, minimizing the chance of assembly displacement. The user then places cellulose-containing bait units 14a in engagement with the main body 12. The moisture-retaining member 18 made of sponge material is placed above the uppermost bait unit 20, and the riser tube 94 is inserted through the aligned openings in the moisture-retaining member 18 and the bait units 14. The cap 16 is positioned on top of the upper portion 22, and water is added to the bait units to moisten the cellulose material.

In one aspect of the invention, it is preferred that the cellulose-containing bait units 30 remain undisturbed for a period of about 30 days to give the foraging pests a chance to locate and feed on the cellulose. From time-to-time, the user may inspect the bait stations formed by the assembly 10. As is schematically illustrated in FIG. 16, the user may use a sensor 132 to check the conditions in the assembly 10. The collected data can be wirelessly sent via a wireless transmitter 134 to a remote location, for instance a monitoring company.

FIG. 17 illustrates possible locations of the bait stations 140 adjacent a building 142. The property may have a tree 144 adjacent the building 142. The tree naturally attracts termites. A termite colony 146 may exist on the property.

Phantom lines 148 illustrate movement of termites from the colony 146 to the tree. The location of the bait stations 140 is selected to be near the building 142 and the tree(s) 144.

FIG. 18 illustrates the termites following the runways and using the blades 30 of the assembly 10 as a guiding path to the center of the cellulose bait units 14. The blades 30 form the vertical walls, which direct the termites and allow then to gain access to the bait units 14.

From time-to-time, the user inspects the bait stations 140 to ascertain whether the bait units 14 have attracted above-ground and/or subterranean termites. After the feeding has begun, poisonous termite bait with active ingredients is added to the assembly 10. If the system 10 is used only for the purpose of monitoring the subterranean activity and detecting the presence of termites no toxic bait need to be added. If the user detects no activity in the system 10, the body 12 can be relocated to a new site. It is envisioned that the body 12 may also need to be relocated should the user detect presence of non-targeted insects, such as arthropods, annelids or mollusks.

Once the bait has been placed in the main body 12, the termites feeding on the bait bring the bait to the colonies. As the toxic substance is consumed by termites, the bait with the cellulose substance is added to the interior space 20 for period of time for the bait to have the intended toxic effect on the colony. The system 10 is periodically inspected to determine whether termites are active within the system 10.

Depending on the activity and the speed of consumption of the cellulose-containing material and the bait, larger or smaller system 10 can be substituted in the selected location. If the cellulose-containing material is consumed within a matter of days a larger body 12 may be needed to hold larger quantity of cellulose-containing substance. The size of the body 12 can range from just a few inches in height and diameter to several feet in diameter. The large unit would be used possibly under a structure where the termite foraging pressure is very high and the colony size and age is greater than average, thus a larger quantity on cellulose would be needed to last 30 days. It is envisioned that the interval to be used as bait replacement period can be set by the pesticide regulatory bodies at 30 to 90 days.

One of the advantages of the system of the present invention is that it most closely mimics the way cellulose is found and consumed by subterranean termites under natural environmental conditions. The cellulose-containing material can be chips of wood, carton, paper, etc. it is placed directly on the ground surface, below and above grade, thus attracting surface-foraging pests. The toxicant in the bait is preferably of the delayed-action type, or an insect growth regulator, pathogen or metabolic inhibitor. Preferably, it comprises a nontoxic cellulose-containing bait composition to which the pesticide toxicant is added. The removal, inspection and/or replacement of the cap 16 does not substantially disturb the network of access passageways established between the termite colony or nest and the system 10 since the body 12 is not displaced during removal and substitution of the cellulose-containing substance with the toxic bait.

Turning now to the second embodiment of the present invention, illustrated in FIG. 5, the upper portion 212 of the main body is shown to be provided with an opening 214 formed at an angle to a longitudinal axis of the upper portion 212. The opening 214 can be used for collection of data and introduction of a sensor 216 (schematically shown in FIG. 16) into the main body 200.

In this embodiment of the invention, the cap 216 forms a reservoir 217 for retaining a pre-determined amount of water 219, which is gradually and slowly dispensed through a bottom opening 218. The top plate 220 of the cap 216 is provided with an inlet opening, similar to the opening 114, through which water supply in the reservoir 217 can be admitted. A short conduit 222 is inserted in the inlet port 224 to guide liquid into the main body 200 of the pest control assembly.

Similarly to the cap 16, the cap 216 has an outwardly extending circumferential flange 221, which allows the user to remove the cap 216 and inspect the conditions of the bait units of the pest control assembly. Other features of the cap 216 and the pest control assembly are similar to the first embodiment, where the lower portion is used to retain a plurality of bait units 14 and the moisture retaining sponge 18. It is envisioned that this embodiment can be particularly advantageous in arid climates.

Figure 11:
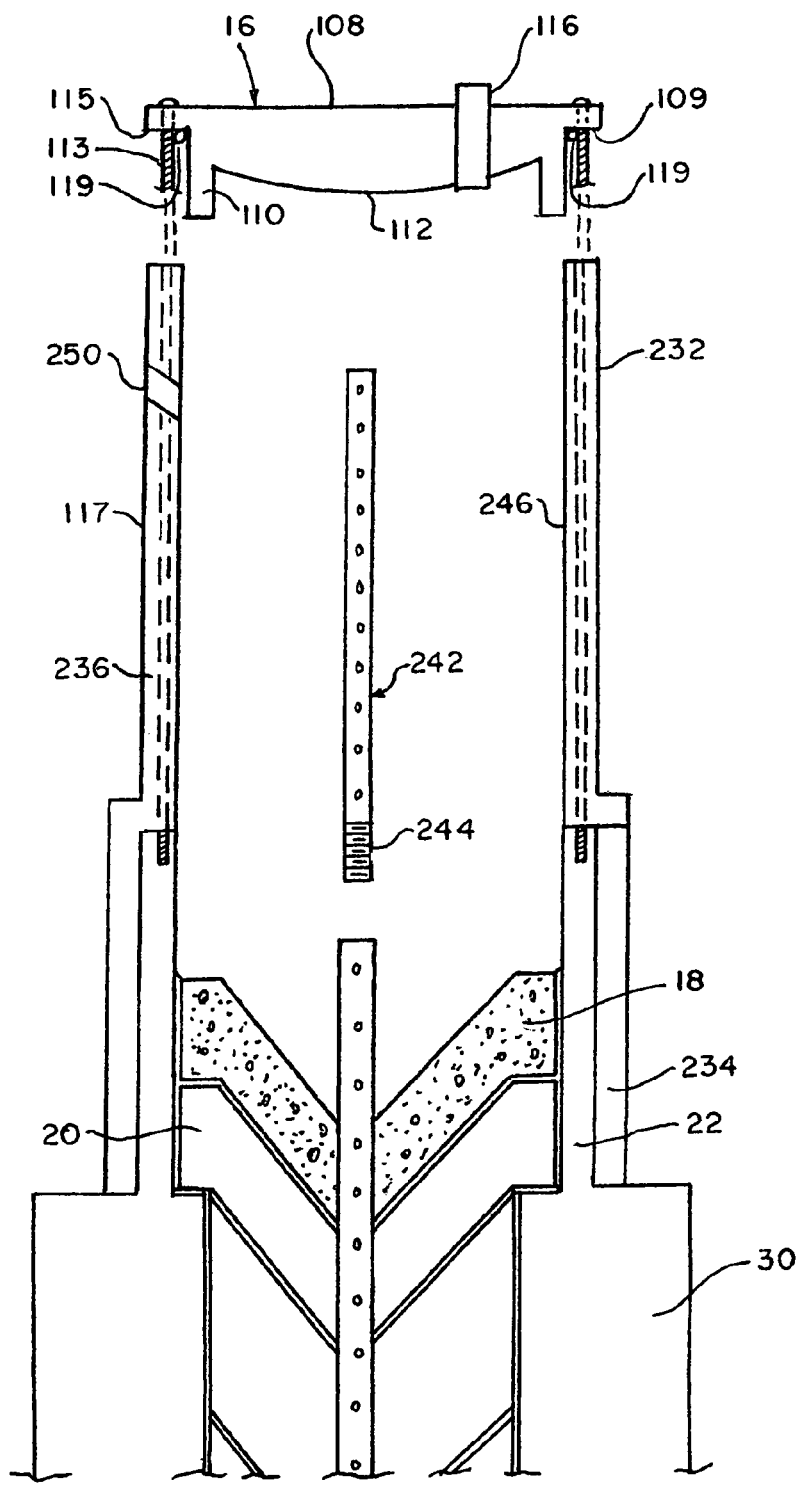
FIG. 11 is detail sectional view of the third embodiment showing an extension riser.
Figure 12:
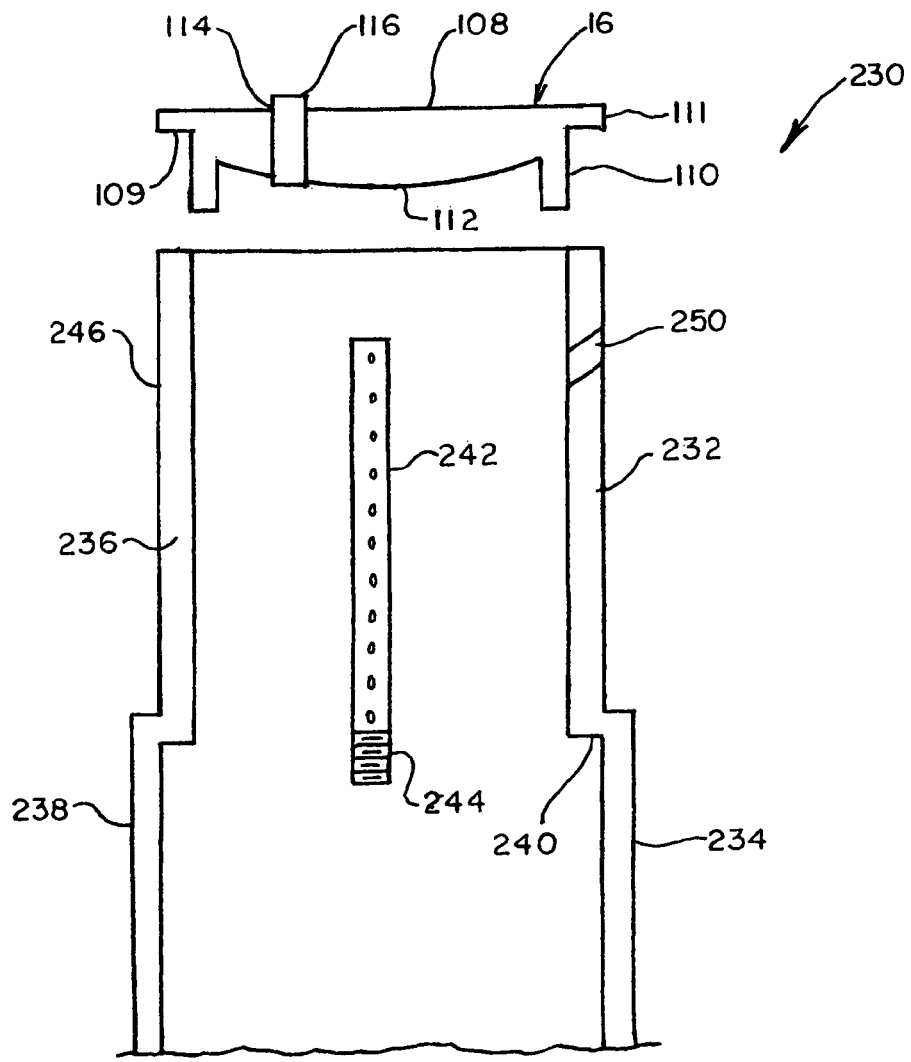
FIG. 12 is detail view of an extension member of the third embodiment of the present invention.

FIGS. 10-12 illustrate a third embodiment of the system of the present invention. In this embodiment, a detachable extension member 230 is added to the upper portion 22 of the main body 12. The extension member 230 comprises a hollow tubular element 232, which has a bottom part 234 and a top part 236. The tubular element 232 has an inner wall 238 provided with an inwardly horizontally extending shoulder 240. The shoulder 240 is configured to rest on the upper edge 28 of the main body 12 when the extension member 230 is engaged with the main body 12. A lower end of the element 232 rests on the upper edge 40 of the blades 30 when the extension member 230 is positioned on the main body 12.

The extension member 230 is provided with an extension riser tube 242 having exterior threads 244 formed on the lower part thereof. The threads 244 are configured to matingly engage inner threads (not shown) of the riser tube 94 of the assembly 10. The extension riser tube 242 is provided with perforations 243, similarly to the perforations 96 formed in the riser tube 94.

A data collection port 250 is formed in the top part 232 since the data collection port 214 may be covered by the extension member 230. The extension member 230 allows introduction of additional bait units 248 in alignment with the bait units 14. The moisture retaining member 18 is placed over the uppermost bait unit, similar to the first embodiment described above.

The cap 16 can be used with the extension member 230 because the diameter of the extension member corresponds to the diameter of the upper portion 22. As can be seen in FIG. 10, the inner wall 23 of the upper portion 22 extends continuously with the inner wall 246 of the top part 236.

Although tap or rain water on the cellulose substance is believed to be sufficient for attracting foraging insects, it is envisioned that liquid attractant can be used instead of tap or rain water. The sugar water can be poured through the opening in the cap 16 to make the bait station even more attractive to the insects.

The cap 16 can be colored in light or dark colors to increase or decrease the internal temperature of the main body and facilitate condensation. Depending on the climate, where the system of the present invention is to be utilized, the cap can be made black or white.

Many other changes and modifications can be made in the system and method of the present invention without departing from the spirit thereof. I, therefore pray that my rights to the present invention be limited only by the scope of the appended claims.

We claim:

1. A system for controlling cellulose-consuming pests in a pre-determined location, comprising:
   a main body having a cylindrical upper portion and a lower portion continuously co-axially formed with the upper portion, said lower portion being provided with a plurality of spaced blades meeting at a lowermost point and defining a sharp bottom point;
   a plurality of bait units fitted in the lower portion and the upper portion;
   a removable cap frictionally fittingly engageable with the upper portion; and
   a moisture-retaining member positionable in the upper portion above an uppermost of the bait units.

2. The system of claim 1, comprising a riser tube extending along a longitudinal axis of the main body and through the bait units.

3. The system of claim 2, said riser tube comprises an elongated tubular body provided with a plurality of perforations allowing moisture circulation through the main body.

4. The system of claim 3, said riser tube has a bottom portion, said bottom portion being provided with longitudinal slots.

5. The system of claim 4, comprising a moisture collector member mounted below the bottom portion of the riser tube.

6. The system of claim 5, said moisture collector member having an inverted cone configuration.

7. The system of claim 2, each of said bait units comprising said a hollow substantially cylindrical central body portion, an upper plate extending over the central body portion, and a lower part extending below central body portion.

8. The system of claim 7, wherein the upper plate has an inverted cone configuration with a widest part of the upper plate being secured to a top edge of the central body portion, while an apex of the upper plate extends downwardly into the central body portion.

9. The system of claim 8, wherein the lower part of the bait unit has an inverted cone configuration with its widest part secured to a bottom edge of the central body portion, while an apex of the lower part extends below the bottom edge of the central body portion.

10. The system of claim 7, wherein the upper part of the bait unit is provided with a central opening and the lower part of the bait unit is provided with a central opening, which is co-axially aligned with the opening formed in the upper plate.

11. The system of claim 7, wherein a plurality of radial slots extends from the upper plate along the central body portion and continues to the lower part.

12. The system of claim 11, wherein the radial slots are configured to receive the blades of the main body when the bait units are fitted to the main body.

13. The system of claim 1, comprising at least one soil displacement member positioned below a lowermost bait unit.

14. The system of claim 1, each of said blades having a substantially triangular configuration.

15. The system of claim 1, wherein said bait units are formed from cellulose-containing material.

16. The system of claim 1, said cap comprising a flat planar top, a cylindrical sidewall extending below the top, and an outwardly convex bottom surface.

17. The system of claim 16, wherein an outside diameter of the sidewall is at least slightly smaller than an inner diameter of the upper portion of the main body such that the sidewall frictionally tightly fits inside the upper portion of the main body.

18. The system of claim 16, wherein a port is formed in the top plate, said port being configured to admit liquid into the main body.

19. The system of claim 16, wherein the bottom surface of the cap is configured to direct condensate moisture into the main body.

20. The system of claim 1, wherein the upper part is provided with a side opening configured to receive a sensor for collection of data about physical conditions inside the main body.

21. The system of claim 1, comprising a means for collecting data about physical conditions inside the main body and for transmitting the collected data to a remote location.

22. The system of claim 2, comprising an extension member detachably engageable with the upper portion of the main body.

23. The system of claim 22, wherein the extension member comprises a hollow tubular element having a bottom part and a top part.

24. The system of claim 23, wherein the tubular element has an inner wall provided with an inwardly horizontally extending shoulder, said inwardly extending shoulder being configured to rest on an upper edge of the main body when the extension member is engaged with the main body.

25. The system of claim 23, wherein a lower end of the tubular element rests on an upper edge of the blades when the extension member is positioned on the main body.

26. The system of claim 22, wherein the extension member comprises an extension riser tube having exterior threads, said exterior threads being configured to mating engage with the riser tube.

27. The system of claim 1, wherein the cap comprises a flat planar top, a cylindrical sidewall extending below the top, and an outwardly convex bottom surface, and wherein a liquid reservoir is formed between the planar top, the bottom surface and the sidewall, said liquid reservoir being configured to retain a pre-determined amount of liquid.

28. The system of claim 27, wherein an opening is formed in the bottom surface of the cap so as to gradually dispense liquid from the liquid reservoir into the main body.

29. The system of claim 27, the planar top comprises an inlet port for depositing liquid into the liquid reservoir.

30. The system of claim 1, wherein the moisture-retaining member is formed from an open-cell foam material.

31. A method of monitoring and controlling cellulose-consuming pests in a selected location, comprising the steps:
   providing an assembly having a main body with a cylindrical upper portion and a lower portion continuously co-axially formed with the upper portion, said lower portion being provided with a plurality of spaced blades meeting at a lowermost point and defining a sharp bottom point;
   providing a plurality of bait units and positioning the bait units in the lower portion and the upper portion;
   providing a moisture-retaining member and positioning the moisture-retaining member above an uppermost of the bait units;
   providing a cap and frictionally fittingly engaging the cap with the upper portion; and
   positioning the main body in the selected location such that at least the lower portion is positioned below ground.

32. The method of claim 31, comprising a step of providing a perforated riser tube and extending the riser tube along a longitudinal axis of the main body and through the bait units, said perforations allowing moisture circulation through the main body and the bait units.

33. The method of claim 32, wherein said riser tube has a bottom portion, said bottom portion being provided with longitudinal slots.

34. The method of claim 33, comprising a step of providing moisture collector member and mounting the moisture collector member below the bottom portion of the riser tube.

35. The method of claim 34, wherein said moisture collector member having an inverted cone configuration.

36. The method of claim 32, each of said bait units comprising said a hollow substantially cylindrical central body portion, an upper plate extending over the central body portion, and a lower part extending below central body portion.

37. The method of claim 36, wherein the upper plate has an inverted cone configuration with a widest part of the upper plate being secured to a top edge of the central body portion, while an apex of the upper plate extends downwardly into the central body portion.

38. The method of claim 36, wherein the lower part of the bait unit has an inverted cone configuration with its widest part secured to a bottom edge of the central body portion, while an apex of the lower part extends below the bottom edge of the central body portion.

39. The method of claim 36, wherein the upper part of the bait unit is provided with a central opening and the lower part of the bait unit is provided with a central opening, which is co-axially aligned with the opening formed in the upper plate, said central opening in the upper plate and the central opening in the lower portion being configured to receive the riser tube therethrough.

40. The method of claim 36, wherein a plurality of radial slots extends from the upper plate along the central body portion and continues to the lower part, said radial slots being configured to receive the blades of the main body when the bait units are fitted to the main body.

41. The method of claim 31, comprising at least one soil displacement member and positioning the at least one soil displacement member below a lowermost bait unit.

42. The method of claim 31, each of said blades having a substantially triangular configuration.

43. The method of claim 31, wherein said bait units are formed from cellulose-containing material.

44. The method of claim 31, said cap comprising a flat planar top, a cylindrical sidewall extending below the top, and an outwardly convex bottom surface.

45. The method of claim 44, wherein an outside diameter of the sidewall is at least slightly smaller than an inner diameter of the upper portion of the main body such that the sidewall frictionally tightly fits inside the upper portion of the main body.

46. The method of claim 44, comprising a step of providing an inlet port in the top plate and depositing a pre-determined amount of liquid through said inlet port into the main body.

47. The method of claim 44, wherein the bottom surface of the cap is configured to direct condensate moisture into the main body.

48. The method of claim 31, wherein the cap comprises a flat planar top, a cylindrical sidewall extending below the top, and an outwardly convex bottom surface, and wherein a liquid reservoir is formed between the planar top, the bottom surface and the sidewall, said liquid reservoir being configured to retain a pre-determined amount of liquid.

49. The method of claim 48, comprising a step of providing an opening in the bottom surface of the cap and gradually dispensing liquid from the liquid reservoir into the main body.

50. The method of claim 48, the planar top comprises an inlet port for depositing liquid into the liquid reservoir.

51. The method of claim 31, wherein the moisture-retaining member is formed from an open-cell foam material.

52. The method of claim 31, wherein the upper part is provided with a side opening.

53. The method of claim 52, comprising a step of positioning a sensor in said side opening and collecting data about physical conditions inside the main body.

54. The method of claim 31, comprising a step of providing a means for collecting data about physical conditions inside the main body and transmitting the collected data to a remote location.

55. The method of claim 32, comprising a step of providing an extension member detachably engageable with the upper portion of the main body.

56. The method of claim 55, wherein the extension member comprises a hollow tubular element having a bottom part and a top part.

57. The method of claim 56, wherein the tubular element has an inner wall provided with an inwardly horizontally extending shoulder, said inwardly extending shoulder being configured to rest on an upper edge of the main body when the extension member is engaged with the main body.

58. The method of claim 56, wherein a lower end of the tubular element rests on an upper edge of the blades when the extension member is positioned on the main body.

59. The method of claim 55, wherein the extension member comprises an extension riser tube having exterior threads formed on the lower part thereof.

60. The method of claim 59, comprising a step of threadably engaging the extension riser tube with the riser tube and adding bait units to the assembly.

* * * * *